United States Patent
Doe

Patent Number: 6,062,029
Date of Patent: May 16, 2000

[54] OPTICAL SOLAR ELECTRIC GENERATOR

[76] Inventor: Charles S. Doe, 701 W. Mineral Ave. #1721, Littleton, Colo. 80120

[21] Appl. No.: 09/078,624

[22] Filed: May 14, 1998

[51] Int. Cl.[7] .................................................. F03G 6/00
[52] U.S. Cl. ................................................. 60/641.15
[58] Field of Search ........................... 60/641.8, 641.11, 60/641.15

[56] References Cited

U.S. PATENT DOCUMENTS

| | | | |
|---|---|---|---|
| 3,868,823 | 3/1975 | Russell, Jr. et al. | 60/641.15 |
| 3,965,683 | 6/1976 | Dix | 60/641.15 |
| 3,999,389 | 12/1976 | Bryce | 60/641.15 |
| 4,144,873 | 3/1979 | Blanton | 60/641.15 |
| 4,168,696 | 9/1979 | Kelly | 60/641.15 |
| 4,232,523 | 11/1980 | Derby et al. | 60/641.15 |
| 4,284,063 | 8/1981 | Watson | 60/641.15 |

*Primary Examiner*—Noah P. Kamen

[57] ABSTRACT

An apparatus for generating electrical energy from solar energy is provided including a housing with a water reservoir mounted therein for storing water therein and dispensing the same from an output thereof. Also included is a heat collecting line mounted within the housing with a first end connected to the output of the water reservoir for receiving water from the water reservoir to be heated to a pressurized gaseous state in the form of steam. A turbine is connected to a second end of the heat collecting line for allowing the passage of steam into the turbine, wherein the turbine is connected to a generator for creating electrical energy.

4 Claims, 1 Drawing Sheet

OPTICAL SOLAR ELECTRIC GENERATOR

BACKGROUND OF THE INVENTION

1. Field of the Invention

The present invention relates to solar energy generators and more particularly pertains to a new optical solar electric generator for efficiently converting solar energy to electrical energy.

2. Description of the Prior Art

The use of solar energy generators is known in the prior art. More specifically, solar energy generators heretofore devised and utilized are known to consist basically of familiar, expected and obvious structural configurations, notwithstanding the myriad of designs encompassed by the crowded prior art which have been developed for the fulfillment of countless objectives and requirements.

Known prior art solar energy generators include U.S. Pat. No. 5,005,360; U.S. Pat. No. 4,171,617; U.S. Pat. No. 4,739,620; U.S. Pat. No. 4,079,591; U.S. Pat. No. 4,377,071; and U.S. Pat. No. 4,167,856.

In these respects, the optical solar electric generator according to the present invention substantially departs from the conventional concepts and designs of the prior art, and in so doing provides an apparatus primarily developed for the purpose of efficiently converting solar energy to electrical energy.

SUMMARY OF THE INVENTION

In view of the foregoing disadvantages inherent in the known types of solar energy generators now present in the prior art, the present invention provides a new optical solar electric generator construction wherein the same can be utilized for efficiently converting solar energy to electrical energy.

The general purpose of the present invention, which will be described subsequently in greater detail, is to provide a new optical solar electric generator apparatus and method which has many of the advantages of the solar energy generators mentioned heretofore and many novel features that result in a new optical solar electric generator which is not anticipated, rendered obvious, suggested, or even implied by any of the prior art solar energy generators, either alone or in any combination thereof.

To attain this, the present invention generally comprises a clear plastic housing. Mounted on a top face of the housing is a plurality of light converging, convex lenses for directing focused solar rays along a line within the housing. A water reservoir is mounted within the housing for storing water therein and dispensing the same from an output thereof. Next provided is a heat collecting line mounted within the housing and situated along the line along which the solar rays are focused. As shown in FIG. 1, a first end of the heat collecting line is connected to the output of the water reservoir with a one-way valve connected therebetween. By this design, the heat collecting line is adapted for receiving water from the water reservoir to be heated to a pressurized gaseous state in the form of steam. Also situated within the housing is a turbine that is connected to a second end of the heat collecting line with a pressure valve coupled therebetween. The collecting line is adapted for allowing the passage of steam into the turbine upon the same being at least a predetermined pressure. As shown in FIG. 1, the turbine is connected to a generator for creating electrical energy. Connected to the electrical generator is a battery for receiving the electrical energy therefrom and storing the same. Associated therewith is a plurality of alternating current receptacles connected to the generator for releasably coupling with various appliances for supplying electrical energy thereto. Next provided is a condenser mounted within the housing. The condenser is connected to the turbine for receiving water therefrom. In the preferred embodiment, the condenser has a fan positioned adjacent thereto for cooling the water received from the turbine. It should be noted that the condenser is connected to the water reservoir for transferring the water thereto after being cooled. With reference still to FIG. 1, an oscillating gear mechanism is shown to be mounted between a bottom of the housing and a recipient surface. Such oscillating gear mechanism is connected to the battery for tilting the housing and lenses about a horizontal axis within a single plane upon the actuation thereof. Finally, a timer is connected to the oscillating gear mechanism for actuating the same such that the lenses of the housing are constantly directed toward a source of the solar rays.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new optical solar electric generator apparatus and method which has many of the advantages of the solar energy generators mentioned heretofore and many novel features that result in a new optical solar electric generator which is not anticipated, rendered obvious, suggested, or even implied by any of the prior art solar energy generators, either alone or in any combination thereof.

It is another object of the present invention to provide a new optical solar electric generator which may be easily and efficiently manufactured and marketed.

It is a further object of the present invention to provide a new optical solar electric generator which is of a durable and reliable construction.

An even further object of the present invention is to provide a new optical solar electric generator which is susceptible of a low cost of manufacture with regard to both materials and labor, and which accordingly is then susceptible of low prices of sale to the consuming public, thereby making such optical solar electric generator economically available to the buying public.

Still yet another object of the present invention is to provide a new optical solar electric generator which provides in the apparatuses and methods of the prior art some of the advantages thereof, while simultaneously overcoming some of the disadvantages normally associated therewith.

Still another abject of the present invention is to provide a new optical solar electric generator for efficiently converting solar energy to electrical energy.

Even still another object of the present invention is to provide a new optical solar electric generator that includes a housing with a water reservoir mounted therein for storing water therein and dispensing the same from an output thereof. Also included is a heat collecting line mounted within the housing with a first end connected to the output of the water reservoir for receiving water from the water reservoir to be heated to a pressurized gaseous state in the form of steam. A turbine is connected to a second end of the heat collecting line for allowing the passage of steam into the turbine, wherein the turbine is connected to a generator for creating electrical energy.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
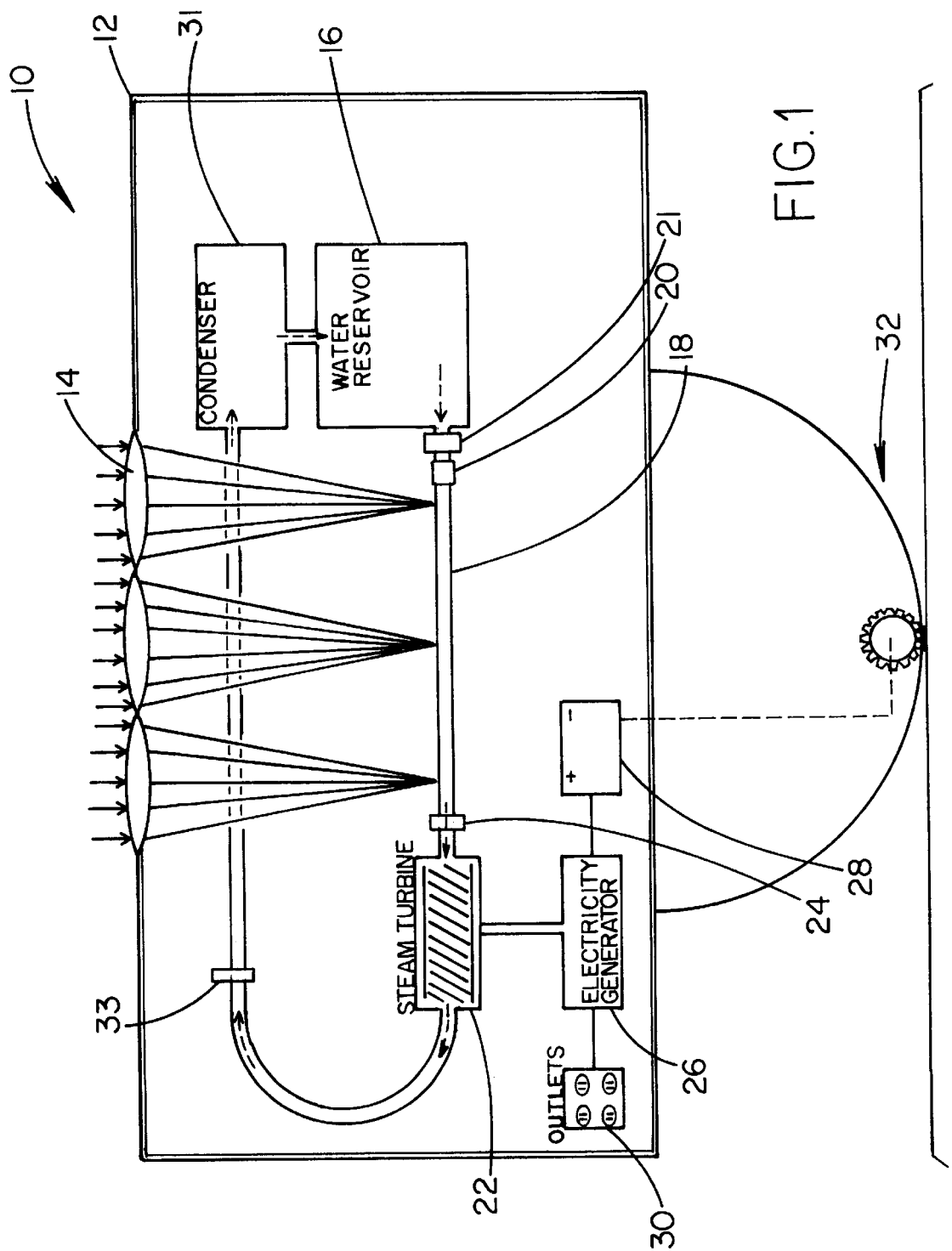
FIG. 1 is a general schematic of a new optical solar electric generator according to the present invention.

With reference now to the drawings, and in particular to FIG. 1 thereof, a new optical solar electric generator embodying the principles and concepts of the present invention and generally designated by the reference numeral 10 will be described.

The present invention, designated as numeral 10, includes a clear plastic housing 12. Ideally, the housing is insulated for containing heat in an efficient manner. Mounted on a top face of the housing is a plurality of light converging, convex lenses 14 for directing focused solar rays along a line within the housing. Preferably, at least three ground glass or "Fresnel" lenses are employed. It should be noted that any other type of lens which converges light may be employed per the desires of the user. A water reservoir 16 is mounted within the housing for storing water therein and dispensing the same from an output thereof.

Next provided is a heat collecting line 18 mounted within the housing and situated along the line along which the solar rays are focused. Ideally, the heat collecting line takes the form of a pipe having a thin wall that conducts heat in an efficient manner. As shown in FIG. 1, a first end of the heat collecting line is connected to the output of the water reservoir with a one-way valve 20 connected therebetween. Also connected between the heat collecting line and the water reservoir is a pump 21 for effecting the flow of water to the heat collecting line per the desires of the user. By this design, the heat collecting line is adapted for receiving water from the water reservoir to be heated to a pressurized, gaseous state in the form of steam.

Also situated within the housing is a turbine 22 that is connected to a second end of the heat collecting line with a pressure valve 24 coupled therebetween. The heat collecting line and associated valve are adapted for allowing the passage of steam into the turbine upon the same being at least a predetermined pressure. It should be noted that any other type of engine may be employed in lieu of the turbine and associated components. For example, a "Sterling" engine may be utilized.

As shown in FIG. 1, the turbine is connected to a generator 26 for creating electrical energy. Such generator is preferably mounted on an exterior of the housing. Connected to the electrical generator is a battery 28 for receiving the electrical energy therefrom and storing the same. Associated therewith is a matrix of alternating current receptacles 30 connected to the generator for releasably coupling with various appliances for supplying electrical energy.

Next provided is a condenser 31 mounted within the housing. The condenser is connected to the turbine with a high pressure release safety valve 33 connected therebetween. In the preferred embodiment, the condenser has a fan positioned adjacent thereto and has a plurality of cooling fins mounted therein. By this structure, the condenser is adapted for cooling the water received from the turbine. It should be noted that the condenser is connected to the water reservoir for transferring the water thereto after being cooled.

With reference still to FIG. 1, an oscillating gear mechanism 32 is shown to be mounted between a bottom of the housing and a recipient surface. Such oscillating gear mechanism is connected to the battery for tilting the housing and lenses in a reciprocating manner about a horizontal axis and within a single plane. To accomplish this, the housing is preferably mounted on an arcuate geared track on which the housing slidably rotates. Associated therewith is gear mounted on the housing and in communication with the track for effecting the tilting of the housing when the motor is actuated.

Finally, an unillustrated timer is connected to the motor of the oscillating gear mechanism for actuating the same such that the lenses of the housing are constantly directed toward a source of the solar rays. It should be noted that the timer controls the housing so that it tilts from a first orientation to a second opposed orientation during the course of a day and further switches back to the first orientation at sundown. As such, a maximum amount of electric energy is generated during day light hours. In another embodiment, a pair of curved substructures may be employed for dual axis tracking. This would allow use of the present invention on mobile units such as campers, ranchers, etc. During use, the present invention would be capable of efficiencies ranging from 20%–40%.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An apparatus for generating electrical energy from solar energy comprising, in combination:

a clear plastic housing;

a plurality of light converging, convex lenses mounted on a top face of the housing for directing focused solar rays along a line within the housing;

a water reservoir mounted within the housing for storing water therein and dispensing the same from an output thereof;

a heat collecting line mounted within the housing and situated along the line along which the solar rays are focused with a first end connected to the output of the water reservoir with a one-way valve connected therebetween for receiving water from the water reservoir to be heated to a pressurized gaseous state in the form of steam;

a turbine situated within the housing and connected to a second end of the heat collecting line with a pressure valve coupled therebetween for allowing the passage of steam into the turbine upon the same being at least a predetermined pressure, wherein the turbine is connected to a generator for creating electrical energy;

a battery situated within the housing and connected to the electrical generator for receiving the electrical energy therefrom and storing the same;

a plurality of alternating current receptacles connected to the generator for releasably coupling with various appliances for supplying electrical energy thereto;

a condenser mounted within the housing and connected to the turbine for receiving water therefrom, the condenser having a fan mounted adjacent thereto for cooling the water received from the turbine, wherein the condenser is connected to the water reservoir for transferring the water thereto after being cooled;

an oscillating gear mechanism mounted between a bottom of the housing and a recipient surface and connected to the battery for tilting the housing and lenses about a horizontal axis within a single plane upon the actuation thereof; and timing means connected to the oscillating gear mechanism for actuating the same such that the lenses of the housing are constantly directed toward a source of the solar rays.

2. An apparatus for generating electrical energy from solar energy comprising:

a housing;

a plurality of light converging lenses mounted on a top face of the housing for focusing light along a line in the housing;

a water reservoir mounted in the housing for storing water therein and dispensing the same from an output thereof;

a heat collecting line for heating water flowing therethrough by way of the focused light, the heat collecting line mounted in the housing and situated along the line along which light is focused, a first end of the heat collecting line being connected to the output of the water reservoir with a one-way valve connected therebetween for receiving water from the water reservoir to be heated to a pressurized gaseous state in the form of steam;

a turbine situated in the housing and connected to a second end of the heat collecting line with a pressure valve coupled therebetween for allowing the passage of steam into the turbine upon the steam reaching at least a predetermined pressure, wherein the turbine is connected to a generator for creating electrical energy;

a battery situated within the housing and connected to the electrical generator for receiving the electrical energy from the generator and storing the electrical energy;

a condenser mounted in the housing and connected to the turbine for receiving water from the turbine, a fan mounted adjacent to the condenser for cooling the water received from the turbine, wherein the condenser is connected to the water reservoir for transferring the water to the reservoir after being cooled; and an oscillating gear mechanism mounted between a bottom of the housing and a recipient surface and connected to the battery for tilting the housing and lenses about a horizontal axis.

3. An apparatus as set forth in claim 2 wherein a plurality of alternating current receptacles are connected to the generator for releasably coupling with various appliances for supplying electrical energy thereto.

4. An apparatus as set forth in claim 2 wherein the apparatus includes a housing formed of a clear plastic material.

* * * * *